INVENTORS
Lars Thorbjörn Collin
Karl Gustav Adolf Andersson
Sverre Ingemar Olsson
BY Pierce, Scheffler & Parker
ATTORNEYS March 12, 1963  L. T. COLLIN ET AL  3,080,705
TWO-STROKE INTERNAL COMBUSTION ENGINE HAVING EIGHT OR
MORE, EVEN NUMBER OF CYLINDERS AND PROVIDED WITH AN
EXHAUST GAS TURBINE DRIVEN BLOWER PLANT FOR THE
SUPPLY OF SCAVENGING AND SUPERCHARGING AIR
Filed June 26, 1961  4 Sheets-Sheet 4
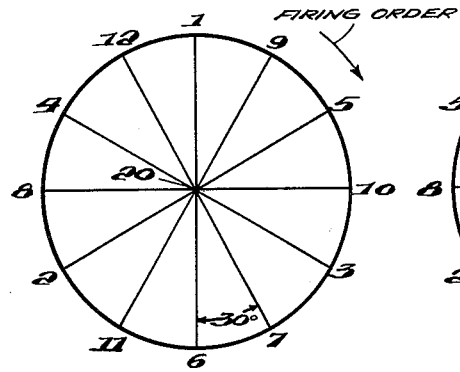
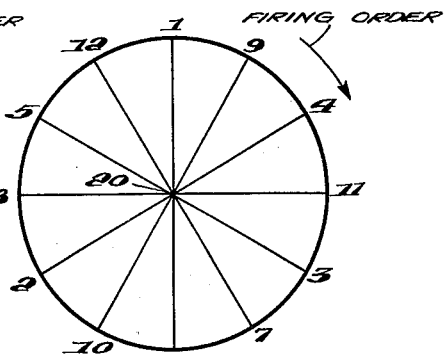
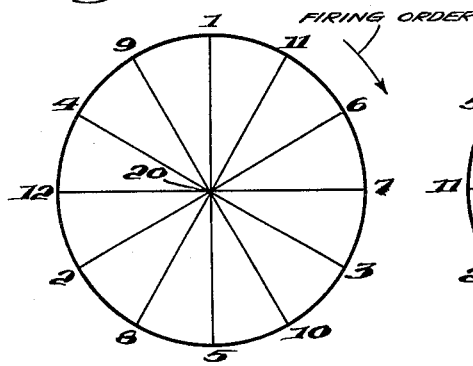
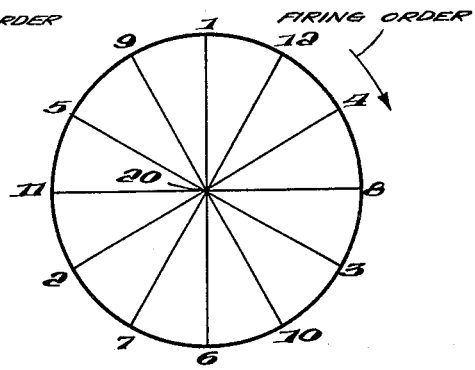
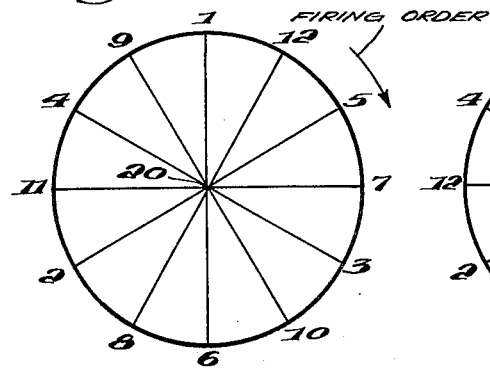
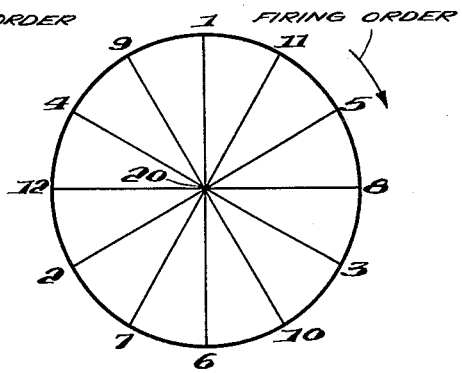
INVENTORS
Lars Thorbjörn Collin
Karl Gustav Adolf Andersson
Sverre Ingemar Olsson
BY
ATTORNEYS United States Patent Office 3,080,705
Patented Mar. 12, 1963

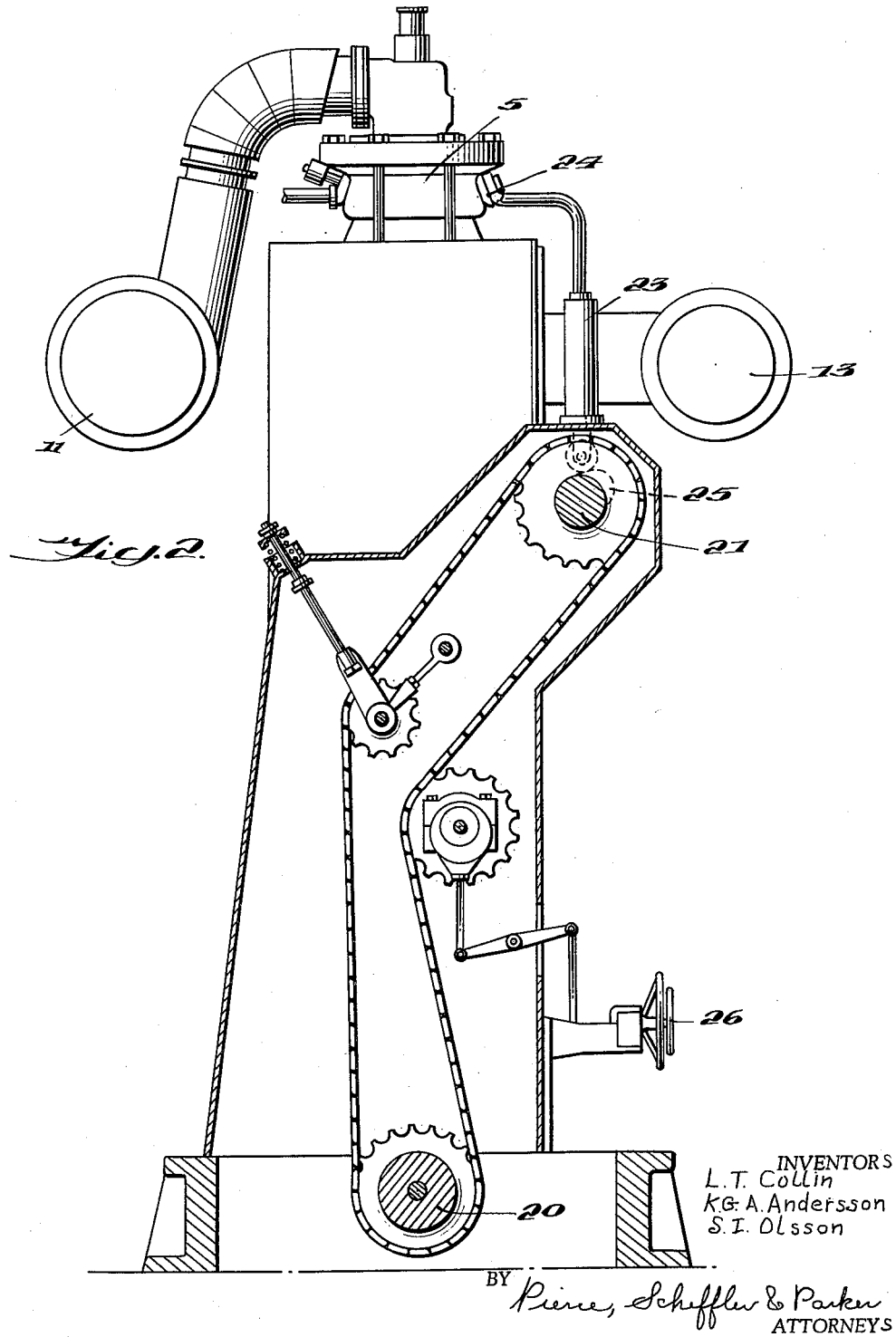

3,080,705
TWO-STROKE INTERNAL COMBUSTION ENGINE HAVING EIGHT OR MORE, EVEN NUMBER OF CYLINDERS AND PROVIDED WITH AN EXHAUST GAS TURBINE DRIVEN BLOWER PLANT FOR THE SUPPLY OF SCAVENGING AND SUPERCHARGING AIR
Lars Thorbjörn Collin, Gustav Andersson, and Sverre Ingemar Olsson, Goteborg, Sweden, assignors to Aktiebolaget Gotaverken, Goteborg, Sweden, a corporation of Sweden
Filed June 26, 1961, Ser. No. 119,415
Claims priority, application Sweden June 30, 1960
13 Claims. (Cl. 60—13)

In internal combustion engines having exhaust gas turbine driven scavenging and supercharging air blowers it is usual to arrange the exhaust system in such a manner, that the exhaust impulses exert a favourable influence upon the scavenging. In supercharge systems working according to the so called pulse principle this is perhaps most marked, but nessitates in two-stroke cycle engines that three cylinders only be connected to the same turbine or to the same inlet part thereof, respectively. This brings about a complicated piping and makes the plant more expensive, as it will be necessary to use several turbine units in a multicylinder engine. In a two stroke cycle engine the gas-exchange period, comprising the emptying of the cylinder during the pre-exhaust period and the usual scavenging period, possibly followed by an after-exhaust period, will cover approximately a third of the working cycle, and the marked increase in pressure, which occurs in the exhaust conduit in connection with the exhaust from one cylinder, will disturb the scavenging of a preceding cylinder, if more than three cylinders are connected to the same conduit.

In plants working with a permanent back pressure on the exhaust side, it is possible to connect more than three cylinders to a common large receiver, but also here each exhaust pulse will bring about a certain increase of the pressure, which depending upon the manner of connection may disturb the scavenging of the other cylinders as well as that of the pertaining cylinder. By grouping the cylinders into units the pressure waves in the exhaust receiver can be made to keep time with the scavenging in such a manner, that the pressure peak brought about by a pulse, has been smoothened out, when the inlet ports of the pertaining cylinder are fully opened. A pulse brought about by another cylinder may somewhat later increase the back pressure in the exhaust piping, thereby influencing the closing part of the scavenging period of the first mentioned cylinder which brings about a better degree of charging. In connection with the scavenging of a cylinder, the consumption of charging air will momentarily increase, which results in a decrease in pressure in the charging air receiver. The pulsating movement brought about thereby may be modified by making the receiver large in relation to the air quantity required by the individual cylinders or by choosing the firing order in such a manner, that the withdrawal of air from the receiver will be evenly distributed over the length of the engine.

The relative positions of the crank arms will define the firing order and determine the load upon the bearings between the cranks as well as the external and internal bending moments acting upon the engine and its foundation and brought about by the inertia of the moving parts and furthermore also upon the additional torque stresses imposed by the torsional vibrations. The firing order will also influence the fluctuations in the charging air receiver and in the exhaust conduit during the gas exchange period, which are advantageous or detrimental to the gas exchange, especially in the case of supercharged engines.

On account of the length of the gas-exchange period the interval between the firing in the cylinders should not be less than 60° and not more than 90°, if it is desired to obtain an advantageous influence of the gas pulses. It is possible to obtain this with 6 or less number of cylinders, but in engines having a greater number of cylinders this may not be realized without special arrangements.

According to the invention it is now proposed that engines having eight or more cylinders of even numbers arranged in-line, with respect to the exhaust gas and air supply piping system shall be divided into two separate halves, each provided with an exhaust gas turbine driven blower and that the crankshaft of the engine shall be so designed, that a firing order with uniform firing intervals and alternate ignitions in each engine half is obtained. Hereby it is possible to design a single acting two stroke internal combustion engine having eight, ten or twelve cylinders, which latter is the highest number at present considered workable in practice, in such a manner that it in this respect will be about the same as two smaller engines and where thus each half may be designed to obtain the most advantageous influence of the gas and air pulses, respectively.

The foregoing objects and advantages will become more apparent from the following detailed description of specific embodiments of the invention and from the accompanying drawings. In these drawings:

FIG. 2 is a vertical section of the engine taken on line 2—2 of FIG. 1; and

Figure 4:
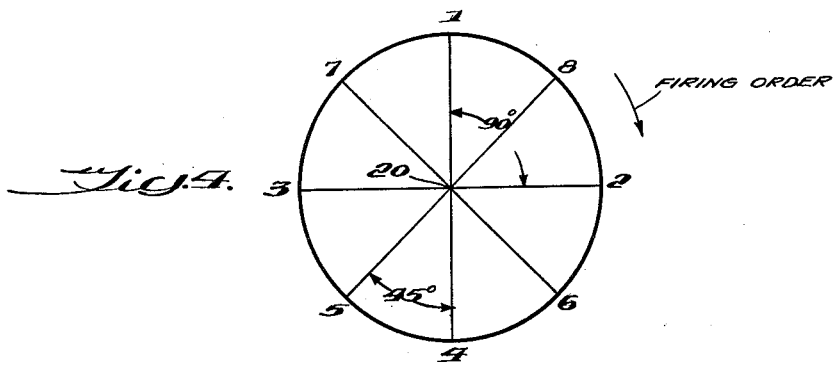
Figure 3:
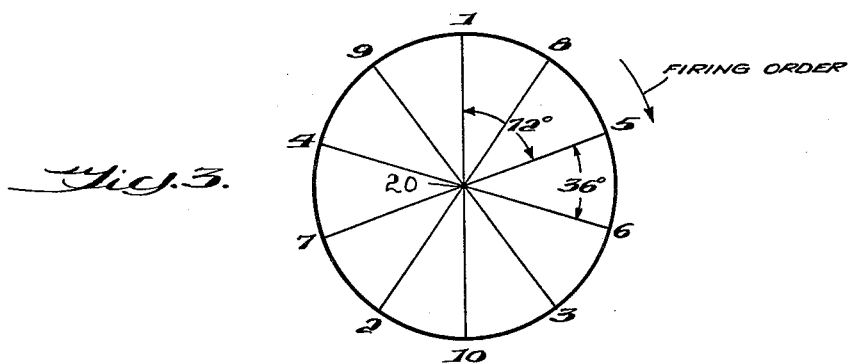
Figure 5:
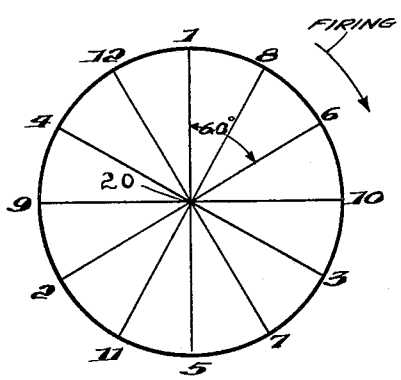
Figure 6:
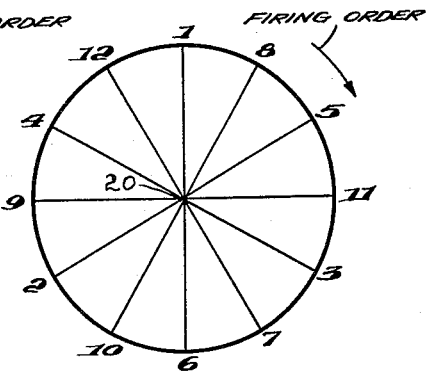

FIGS. 3–12 are circle diagrams illustrating the cylinder firing orders for different engines in accordance with the invention and also the angles between crank arms. FIG. 3 illustrates one suitable firing order for an engine having ten cylinders with five cylinders in each separate engine half. FIG. 4 illustrates one suitable firing order for an engine having eight cylinders with four cylinders in each separate engine half. FIGS. 5–12 illustrate various suitable firing orders for an engine having twelve cylinders with six cylinders in each separate engine half.

Figure 1:
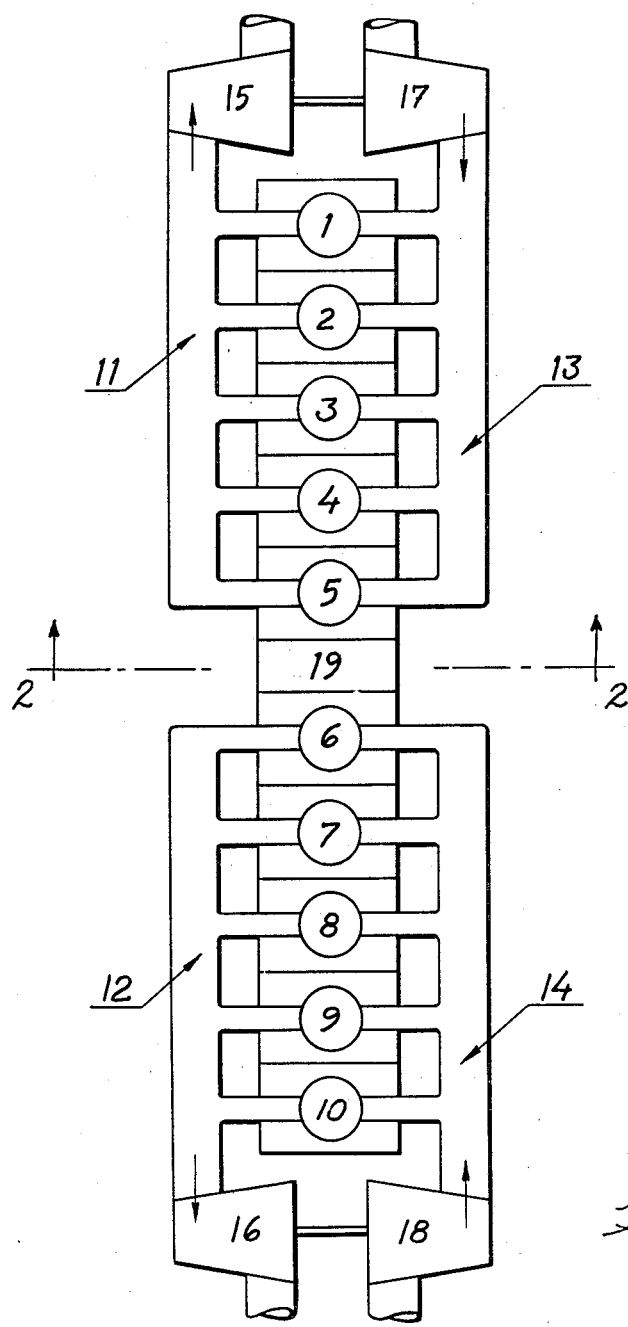
FIG. 1 is a schematic plan view of a single acting two-stroke internal combustion engine according to the invention with ten cylinders arranged in-line, these cylinders being arranged in two separate engine halves of five cylinders each located respectively at opposite sides of an entablature.

With reference now to FIGS. 1–3 which relate to an engine of the single acting two-stroke cycle type with ten cylinders, it will be seen that one half thereof containing cylinders Nos. 1 to 5 forms with respect to the exhaust gas and the charging air conduits one part, which is wholly separated from the other half, comprising the cylinders Nos. 6 to 10. Between the engine halves a separate entablature 19 is provided, in which the driving means for the camshaft of the engine are arranged. In FIG. 2, the crankshaft of the engine is shown at 20 and is connected in driving relation to the camshaft 21 by the usual chain drive. This view also shows the usual arrangement of fuel pump 23 operated by a cam 25 on the camshaft 21, fuel injection valve 24 and the usual hand actuated member 26 which controls engine starting and reversing, and fuel supply. There is one exhaust gas conduit 11 for the one engine half and a corresponding conduit 12 for the other half, and similarly there is a charging air receiver 13 at the first mentioned engine half, and a corresponding receiver 14 at the other half. For each engine half there is an exhaust gas turbine 15 and 16, respectively, and an air compressor 17 and 18, respectively.

The crankshaft 20 is preferably designed in such a manner that two adjacent cranks within each engine half are displaced at least 72° in relation to each other (360° divided by one half of the number of cylinders) and furthermore so arranged that the firing order will be 1–8–5–6–3–10–2–7–4–9.

The angle between the crank-arms pertaining to the cylinders to each side of the intermediate entablature i.e cylinders Nos. 5 and 6, will be 36° only, but in connection with the intermediate frame there will always be two crankshaft bearings between the adjacent cylinders. On account of that the two firing impulses from these cylinders, which thus occur more closely upon each other than is the case otherwise in the engine, will not have any detrimental influence upon the engine.

FIG. 3 shows the firing order for the ten cylinder engine above referred to and shows also the 72° displacement between the five cranks in each engine half as well as the 36° angle between the cranks of cylinders 5 and 6.

FIG. 4 illustrates the invention as applied to an eight cylinder engine wherein cylinders Nos. 1–4 constituting one engine half would be arranged to one side of the entablature between the engine halves, and cylinders Nos. 5–8 constituting the other engine half would be arranged to the other side of the entablature. The firing order for such an eight cylinder engine as shown in FIG. 4 would be 1–8–2–6–4–5–3–7. It is seen here that the angle between adjacent cranks in each half is 90° and that the angle between cranks 4 and 5 on opposite sides of the entablature is 45°.

In order to keep the stresses within a 12-cylinder engine low the cranks are according to the invention arranged in such a manner that two adjacent cranks within each engine half are displaced at least 60° in relation to each other. It is still more advantageous to arrange the firing order in such a manner that the ignitions within each half occur alternatingly within each group of three cylinders. With certain firing orders the two halves of the crank shaft will be identical which of course will simplify the manufacturing process.

The angle between the crank-arms pertaining to the cylinders to each side of the intermediate entablature is 30° only, but also in this case there will always be two crankshaft bearings between the cylinders on both sides of the intermediate frame.

With a 12-cylinder engine the following eight firing orders

```
1  8  6 10  3  7  5 11  2  9  4 12
1  8  5 11  3  7  6 10  2  9  4 12
1  9  5 10  3  7  6 11  2  8  4 12
1  9  4 11  3  7  6 10  2  8  5 12
1 11  6  7  3 10  5  8  2 12  4  9
1 12  4  8  3 10  6  7  2 11  5  9
1 12  5  7  3 10  6  8  2 11  4  9
1 11  5  8  3 10  6  7  2 12  4  9
``` will meet the requirements imposed by above mentioned considerations concerning fair values of free forces, external and internal rotating moments, moments of the 1st and 2nd degree and additional stresses brought about by the torsional vibrations. Simultaneously the charging of the individual cylinders will occur with a slight influence only of the fluctuations brought about by the exhaust pulses of the various cylinders.

FIGS. 5–12 illustrate respectively the above mentioned eight different firing orders for the cylinders in a twelve cylinder engine. In this case cylinders Nos. 1–6 constituting one engine half would be arranged to one side of the entablature between engine halves, and cylinders Nos. 7–12 constituting the other engine half would be arranged to the other side of the entablature. It is seen here that the angle between adjacent cranks in each engine half is 60°, and that the angle between cranks on opposite sides of the entablature, such as cranks 6 and 7 shown in FIG. 7, is 30°.

What we claim is:

1. A single acting two-stroke internal combustion engine having eight or more cylinders of even numbers arranged in-line, a crank shaft and a cam shaft in said engine, an intermediate entablature dividing said cylinders in two like groups and containing a transmission between the crank shaft and the cam shaft, a gas collecting conduit at each of said groups of cylinders of sufficient volume to maintain during operation a mainly constant counter-pressure, an exhaust gas turbine in each of said conduits, a charging air compressor driven by each of said turbines, a charging air distributing conduit from each of said compressors to each group of cylinders, respectively, the crank shaft being so designed that a firing order with alternate ignitions within each group of cylinders and with uniform intervals, which in each cylinder group is not less than 60° or not more than 90°, is obtained.

2. A single acting two-stroke internal combustion engine having ten cylinders arranged in-line, a crank shaft and a cam shaft in said engine, an intermediate entablature dividing said cylinders in two like groups and containing a transmission between the crank shaft and the cam shaft, a gas collecting conduit at each of said groups of cylinders of sufficient volume to maintain during operation a mainly constant counter-pressure, an exhaust gas turbine in each of said conduits, a charging air compressor driven by each of said turbines, a charging air distributing conduit from each of said compressors to each group of cylinders, respectively, the crank shaft being so designed that two adjacent cranks within each engine half are displaced at least 72° in relation to each other and that a firing order of 1–8–5–6–3–10–2–7–4–9 with uniform firing intervals and alternate ignitions in each group of cylinders is obtained.

3. A single acting two-stroke internal combustion engine having twelve cylinders arranged in-line, a crank shaft and a cam shaft in said engine, an intermediate entablature dividing said cylinders in two like groups and containing a transmission between the crank shaft and the cam shaft, a gas collecting conduit at each of said groups of cylinders of sufficient volume to maintain during operation a mainly constant counter-pressure, an exhaust gas turbine in each of said conduits, a charging air compressor driven by each of said turbines, a charging air distributing conduit from each of said compressors to each group of cylinders, respectively, the crank shaft being so designed that two adjacent cranks within each engine half are displaced at least 60° in relation to each other and that a firing order with uniform firing intervals and alternate ignitions in each group of cylinder is obtained.

4. A single acting two-stroke internal combustion engine having twelve cylinders arranged in-line, a crank shaft and a cam shaft in said engine, an intermediate entablature dividing said cylinders in two like groups and containing a transmission between the crank shaft and the cam shaft, a gas collecting conduit at each of said groups of cylinders of sufficient volume to maintain during operation a mainly constant counter-pressure, an exhaust gas turbine in each of said conduits, a charging air compressor driven by each of said turbines, a charging air distributing conduit from each of said compressors to each group of cylinders, respectively, the crank shaft being composed of four sub-groups containing three cranks each, said sub-groups being grouped together corresponding to the division of cylinders in such a manner that two adjacent cranks within each engine half are displaced at least 60° in relation to each other and that a firing order with uniform firing intervals and alternate ignitions in each group of cylinders and within each group alternatingly with each sub-group is obtained.

5. A twelve-cylinder two-stroke internal combustion engine according to claim 4, in which the crank shaft is so designed that a firing order of 1–8–6–10–3–7–5–11–2–9–4–12 is obtained.

6. A twelve-cylinder two-stroke internal combustion engine according to claim 4, in which the crank shaft is so designed that a firing order of 1–8–5–11–3–7–6–10–2–9–4–12 is obtained.

7. A twelve-cylinder two-stroke internal combustion engine according to claim 4, in which the crank shaft is so designed that a firing order of 1–9–5–10–3–7–6–11–2–8–4–12 is obtained.

8. A twelve-cylinder two-stroke internal combustion engine according to claim 4, in which the crank shaft is so designed that a firing order of 1–9–4–11–3–7–6–10–2–8–5–12 is obtained.

9. A twelve-cylinder two-stroke internal combustion engine according to claim 4, in which the crank shaft is so designed that a firing order of 1–11–6–7–3–10–5–8–2–12–4–9 is obtained.

10. A twelve-cylinder two-stroke internal combustion engine according to claim 4, in which the crank shaft is so designed that a firing order of 1–12–4–8–3–10–6–7–2–11–5–9 is obtained.

11. A twelve-cylinder two-stroke internal combustion engine according to claim 4, in which the crank shaft is so designed that a firing order of 1–12–5–7–3–10–6–8–2–11–4–9 is obtained.

12. A twelve-cylinder two-stroke internal combustion engine according to claim 4, in which the crank shaft is so designed that a firing order of 1–11–5–8–3–10–6–7–2–12–4–9 is obtained.

13. A single acting two-stroke internal combustion engine having an even number of eight or more cylinders arranged in-line, a crank shaft and a cam shaft in said engine, an intermediate entablature dividing said cylinders in two like groups and containing a transmission between the crank shaft and the cam shaft, a gas collecting conduit at each of said groups of cylinders of sufficient volume to maintain during operation a mainly constant counter-pressure, an exhaust gas turbine in each of said conduits, a charging air compressor driven by each of said turbines, a charging air distributing conduit from each of said compressors to each group of cylinders, respectively, said crank shaft being so designed that on the one hand two adjacent cranks within each engine half are displaced at least 360° divided by one-half the total number of cylinders and on the other hand the angular displacement between the cranks of the cylinders on opposite sides of said intermediate entablature is one half the angular displacement between the cranks of each engine half and further so that alternate ignitions within each group of cylinders and with uniform intervals, which in each cylinder group is not less than 60° or not more than 90°, is obtained.

References Cited in the file of this patent
UNITED STATES PATENTS

| | | |
|---|---|---|
| 2,034,397 | Kalb et al. | Mar. 17, 1936 |
| 2,199,276 | Barkeij | Apr. 30, 1940 |
| 2,838,907 | Cowland | June 17, 1958 |